United States Patent [19]

Buggert

[11] Patent Number: 4,750,107
[45] Date of Patent: Jun. 7, 1988

[54] PRINTER-TAPE DATA LINK PROCESSOR WITH DMA SLAVE CONTROLLER WHICH AUTOMATICALLY SWITCHES BETWEEN DUAL OUTPUT CONTROL DATA CHOMELS

[75] Inventor: Jerrold E. Buggert, San Juan Capistrano, Calif.

[73] Assignee: Unisys Corporation, Detroit, Mich.

[21] Appl. No.: 689,209

[22] Filed: Jan. 7, 1985

[51] Int. Cl.$^4$ .................. G06F 13/10; G06F 13/32
[52] U.S. Cl. ................................................. 364/200
[58] Field of Search ............................ 364/200, 900

[56] References Cited

U.S. PATENT DOCUMENTS

| 3,573,852 | 4/1971 | Waston | 364/200 |
|---|---|---|---|
| 4,162,520 | 7/1979 | Cook et al. | 364/200 |
| 4,371,932 | 2/1983 | Dinwiddie, Jr. et al. | 364/200 |
| 4,516,199 | 5/1985 | Frieder et al. | 364/200 |
| 4,525,839 | 6/1985 | Nozawa et al. | 371/10 |
| 4,538,224 | 8/1985 | Peterson | 364/200 |
| 4,543,626 | 9/1985 | Bean et al. | 364/200 |
| 4,546,351 | 10/1985 | Nambn | 340/825.5 |
| 4,549,263 | 10/1985 | Calder | 364/200 |
| 4,602,331 | 7/1986 | Sheth | 364/200 |
| 4,616,337 | 10/1986 | Sheth | 364/900 |

OTHER PUBLICATIONS

Satoh–"Terminal Communication Adapter", IBM TDB, vol. 26, No. 12, May 1984, pp. 6504–6505.
Hays–"Standard Printer or I/D Adapter Emtrol Method and Apparatus", IBM TDB, vol. 22, No. 1, Jun. 1979, pp. 269–271.

Primary Examiner—Archie E. Williams, Jr.
Assistant Examiner—Thomas C. Lee
Attorney, Agent, or Firm—Alfred W. Kozak; Nathan Cass; L. Joseph Marhoefer

[57] ABSTRACT

A peripheral controller (data link processor) controls data transfers between a host computer and a plurality of tape peripheral units and a single printer peripheral unit. A master microprocessor commands three subordinate controllers to permit concurrent data transfers through a buffer memory in both the Read and the Write directions. A dual channel control from the master microprocessor actuates a DMA switch so that data transfers to/from the tape units can be controlled by switching on alternate control lines which regulate the data transfer operations.

7 Claims, 10 Drawing Sheets

FIG.2. PRINTER/TAPE DLP (DATA FLOW).

FIG.3. CONTROL LINES – MICROPROCESSOR SYSTEM.

FIG. 4A. PRINTER-TAPE: DATA LINK PROCESSOR.

PRINTER INTERFACE STATE MACHINE-FLOW CHART.

FIG. 6.
TAPE INTERFACE STATE MACHINE-FLOW CHART.

μPROCESSOR INTERFACE (I/F)

WRITE

CHECK STATUS
INITIALIAZE DMA FOR WRITE
LOAD FIRST WORD TO I/F
START TRANSFER ⟶ PROVIDE 1st BYTE
↓
WAIT FOR WSTR
↓ YES      NO
TEOD

PROVIDE 2nd BYTE W/LASTWRD          PROVIDE 2nd BYTE
CHECK STATUS ⟵                      ↓
                                     WAIT FOR WSTR
                                     ↓ YES     NO
                                     PROVIDE TREQ
                                     TACK LATCHES DATA

READ

CHECK STATUS
INITIALIZE DMA
START TRANSFER ⟶ WAIT FOR RSTR
                 RSTR LATCHES 1st BYTE
                 IDBY & RSTR?
                 NO ↙        ↘ YES
                 SET ODDXFR    RSTR LATCHES 2nd BYTE
(SEE FIG.6A. FOR LOG.)   SET TEOB   PROVIDE TREQ
                                    TACK ENABLES
                                    DATA ONTO UPDAT
                                    IDBY & RSTR? ⟶ YES
                                    ↓ NO
CHECK STATUS ⟵          ⟵ SET TEOB

FIG. 6A.

WSTR = WRITE STROBE
TEOD = TAPE-END OF DATA
WLASTWD = WRITE-LAST WORD
TEOB = TAPE-END OF BLOCK
TREQ = TAPE REQUEST
RSTR = READ STROBE
UPDAT = MICRO PROCESSOR DATA
IDBY = DATA-BUSY
ODD X FR = ODD BYTE-TRANSFER

FIG. 7A.

CLK = CLOCK
ALE = ADDRESS LATCH ENABLE
M/IO = MEMORY or I/O SELECT
AD∅15 = ADDRESS LINES 0-15
$\overline{RD}$ = READ
DT/$\overline{R}$ = DATA $\begin{cases} \text{TRANSMIT} \\ \text{RECEIVE} \end{cases}$

FIG.7. MICRO-PROCESSOR / DLI BUFFER TIMING.
READ: (MICRO-PROCESSOR SYSTEM.)   (SEE FIG.7A.)
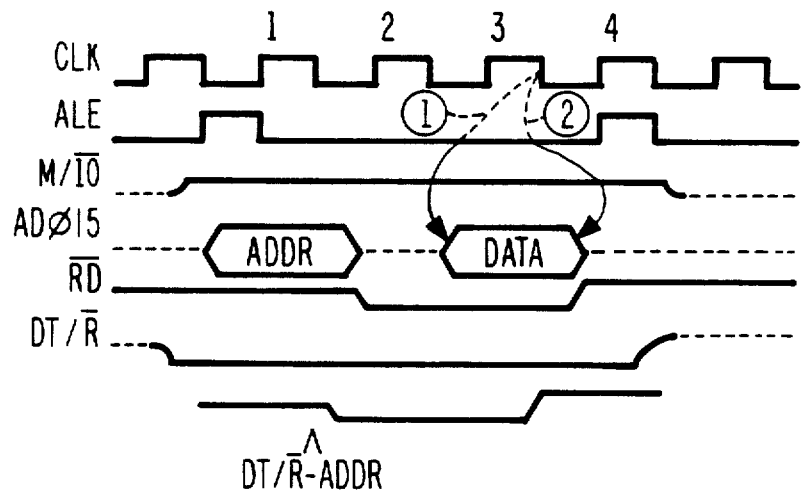
WRITE: (MICRO-PROCESSOR SYSTEM USING MICRO-PROC. DMA CONTROLLER.)
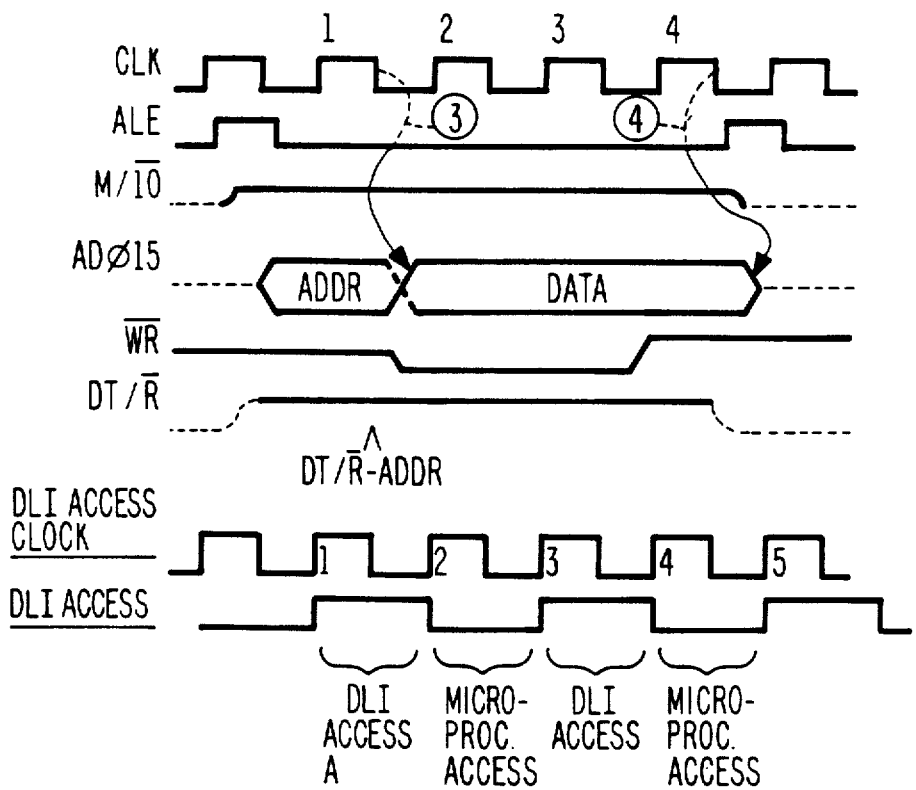

PRINTER-TAPE DATA LINK PROCESSOR WITH DMA SLAVE CONTROLLER WHICH AUTOMATICALLY SWITCHES BETWEEN DUAL OUTPUT CONTROL DATA CHOMELS

FIELD OF THE INVENTION

This disclosure relates to peripheral controllers which are used to transfer data and control signals from a main host processor system to remote peripherals and to provide the functions of an input-output controller for data transfer operations.

BACKGROUND OF THE INVENTION

It is one of the basic functions of a computer system to communicate with remote peripheral devices in order that data transfers and control signals may be interchanged in order to accomplish the purposes designed into the computer system or network.

In order to facilitate this data interchange, there have been developed peripheral controllers, also called I/O controllers or Data Link Processors (DLP's), which relieve the main host computer of many of its operating cycles for the purposes of seeing to it that data exchanges between various remote peripheral devices and the main host computer system can be accomplished with minimal interruption to the main host computer system.

A series of specialized I/O controllers have been developed by the Burroughs Corporation for handling the specialized requirements of Burroughs computer systems and peripherals. These specialized peripheral controllers have been designated as "data link processors", or DLP's.

These specialized Burroughs data link processors have been specifically designed to handle the applicable protocols and the various data transfer requirements usable by Burroughs computer and Burroughs peripheral devices. Such types of data link processors have been described in such prior patents as:

U.S. Pat. No. 4,313,162 entitled "I/O Subsystem Using Data Link Processors"; U.S. Pat. No. 4,371,948 entitled "Train-Printer-Data Link Processor"; U.S. Pat. No. 4,390,964 entitled "Input/Output Subsystem Using Card Reader Peripheral Controller".

These background patents are included herein by reference to furnish the background and functional operation of data link processors which are used to link a host computer and peripheral terminals.

These patents describe the unique features and operations of the Burroughs type of data link processors and provide specific details of operation of the data link processors in conjunction with Burroughs computer systems and networks. These prior patent applications describe the various types of possible operations and data transfer control signals which are used in data link processors. Accordingly, these patent applications will provide an in depth background and explanation of the various hardware and intercooperating features which are used in data link processors.

The present invention is a data link processor which is compatible with Burroughs computer networks and systems but which has been specifically developed to handle two types of remote peripheral devices by means of one single data link processor. This data link processor is called the buffered printer-tape data link processor (PT-DLP) and is disclosed herein.

SUMMARY OF THE INVENTION

The present disclosure presents a combination of intercooperating hardware elements which interface the main host computer system on the one hand and provide for data transfers and communication to and from two different types of remote peripheral units. These peripheral units constitute a buffered-printer terminal unit and also a streamer tape peripheral unit which may be daisy chained to provide communication transfers between the host and four tape units.

Thus, the present system architecture permits the sharing of one host system interface between two peripheral interfaces by means of one particular unit designated as the printer-tape data link processor.

The present system also permits the interleaving of data in a data link interface (DLI) data storage unit (buffer memory) such that data coming into the buffer memory can be interleaved with data coming out of the buffer memory simultaneously so that a buffer memory device can operate to permit the flow of data from a peripheral unit to the main host system and also simultaneously permit the flow of data from the main host system to the particularly selected remote terminal unit.

The data link processor system described herein also provides for the automatic switching of direct memory access control data (DMA) channels for control of data transfers to and from the peripheral tape units.

The system is organized such that one master microprocessor system can cooperate with three slave controllers to concurrently handle data transfers to and from the main host system concurrently with data transfers to and from the two types of remote peripheral units.

As heretofore mentioned, the DLI data storage unit (buffered memory) provides for the simultaneous function of interleaved data flow to and from the host system and to and from each of the two types of peripheral units. This is accomplished by a look-ahead function in hardware of the host and the peripheral interface units.

A direct memory access (DMA) switch unit is provided with two control data channels to the tape control unit which are used to manage data transfers between the master microprocessor and the tape peripheral units. When "control data" is being transferred from along one channel to a tape control unit and subsequently the actual "data" transfer cycle is concluded, then the tape control unit is automatically switched to connect to the other "control data" channel without the need for intervention by the master microprocessor system. This is done to maintain more rapid data flow in both directions without having to burden the master microprocessor.

Thus, the architecture of the presently disclosed printer-tape data link processor provides for a very efficient and time saving method by which one particular I/O controller can regulate the data transfer flows between two types of peripheral terminal units (in particular a printer unit and up to four tape units) all the while permitting simultaneous data transfer operations from a buffer memory in both directions to and from the main host computer and to and from the peripheral units.

BRIEF DESCRIPTION OF THE DRAWINGS

FIGS. 6 and 6A together are a functional flow diagram which shows the basic operation of the tape interface state machine;

FIGS. 7 and 7A together are a timing diagram of the Read cycle Write cycle and DLI Access cycle of the microprocessor system and shows the DLI state machine controller access period interleaved with the microprocessor system access period for inserting or withdrawing data from the buffer memory of the data link processor.

DESCRIPTION OF THE PREFERRED EMBODIMENT

As with other types of Burroughs data link processors, such as those described under the headline "Background of the Invention", the present data link processor is compatible with most computer systems which use the message level interface (MLI) for parallel transfer of data control signals and data between the main host system and the data link processor as was described in the earlier patent cases on data link processors. Thus, in FIG. 1, the distribution card 20 interfaces the host via the MLI, and interfaces the data link processor via the DLI.

Figure 1:
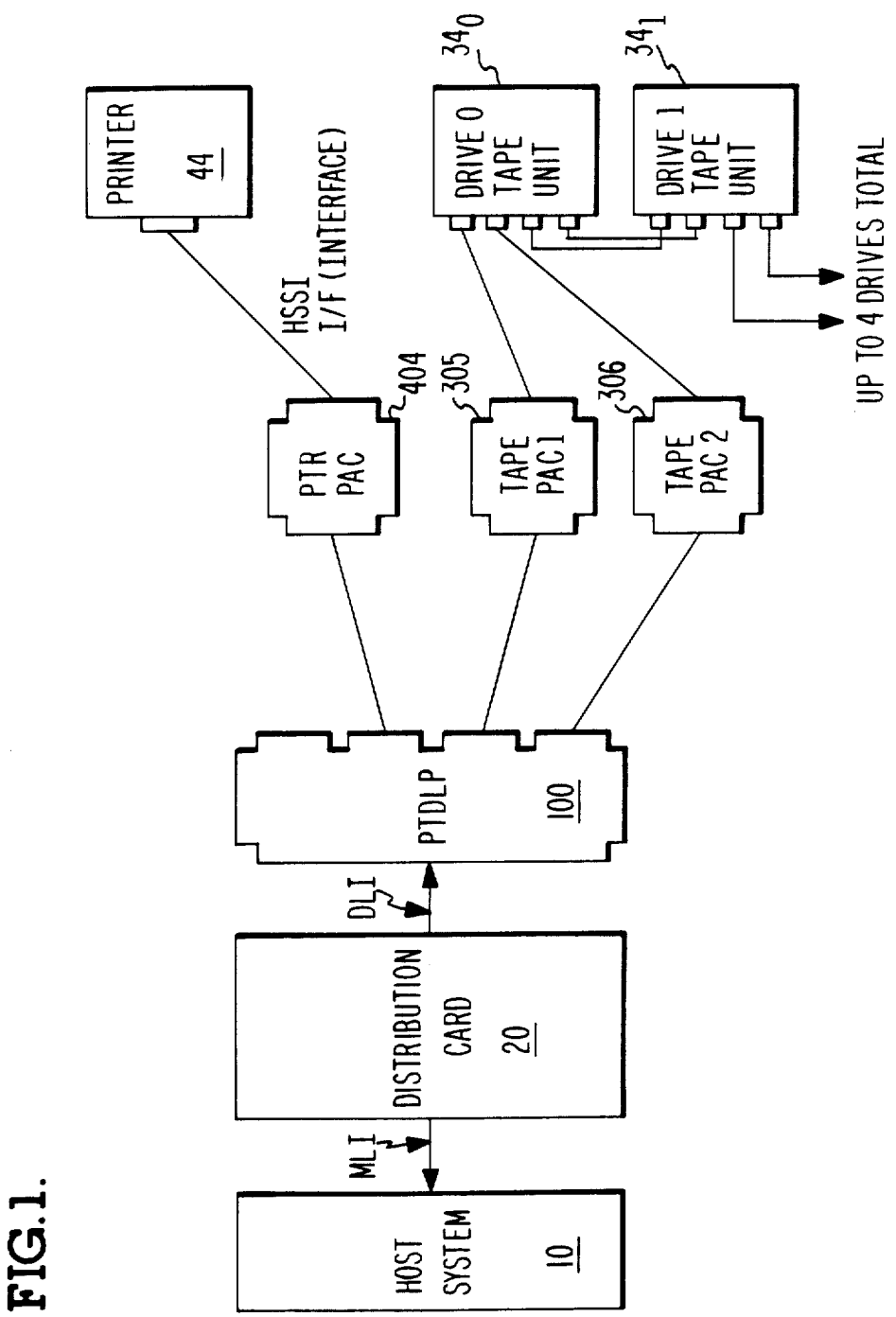
FIG. 1 is a block diagram showing how the printer-tape data link processor operates with a main host system in order to provide an interface to remote peripheral units.

The printer-tape data link processor (PTDLP) 100, FIG. 1 when seen from the viewpoint of the host computer system, will be seen by that system as a separate printer DLP and a separate streamer-tape DLP. Each of these two functional data link processors (which are here combined in one unit) have an address line (LCP address) and also a request line (LCP request) line just as if they were two separate data link processors. Thus, the functions and description of the present printer-tape data link processor will be presented descriptively in two sections which will be descriptive of the buffered printer section and another section which is descriptive of the streamer tape section.

All the hardware of the printer-tape data link processor is mounted on one logic board which interfaces to a data link interface backplane. There are front plane cables which connect to the peripheral adapter cards (PAC's) which are shown in FIGS. 1 and 4 as elements 305, 306 and 404 (connected to printer 44). Thus, as seen, there is one PAC 404 used in the printer interface 40, FIG. 2, and there are two PACs (305, 306) connected to tape drives 34$_o$ and 34$_i$, which are used in the streamer tape interface units 30, FIGS. 2 and 3.

Figure 2:
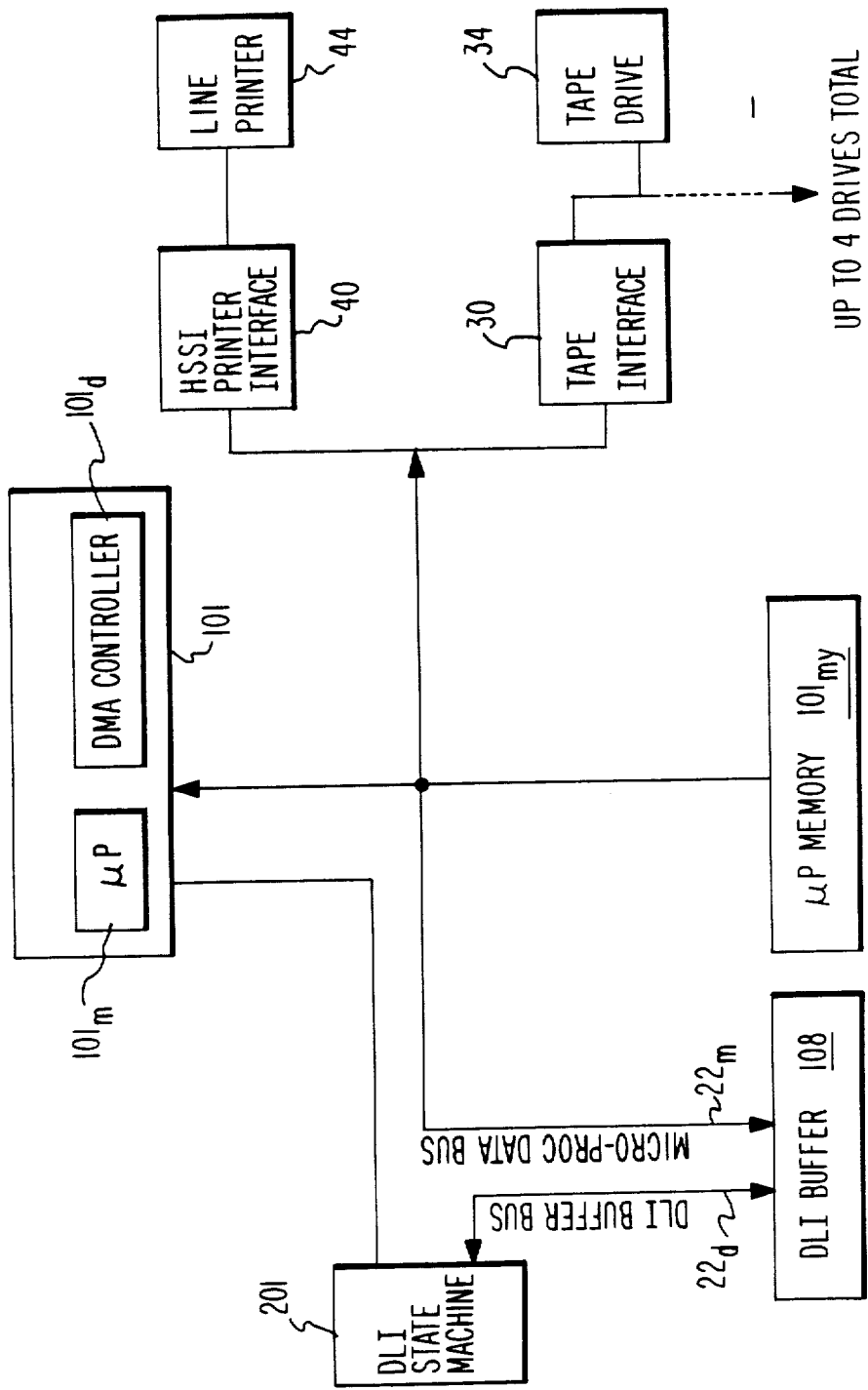
FIG. 2 is a block diagram showing the main elements of the printer-tape data link processor with special reference to the data flow lines.

The streamer tape interface unit will be seen on FIG. 2 as element 30 and it will allow direct connection to four magnetic tape streamer units such as developed by the Burroughs Corporation for magnetic tape peripheral units. This interface 30 does not require (and also does not permit) a tape control unit (TCU) in the path to the tape drive. The formatter and the control for the tape drive are contained within the tape drive.

As seen in FIG. 1 the tape drives can be daisy chained one to another such that up to four magnetic tape streamer units can be daisy chained using a single controller card and the two peripheral adapter cards 305 and 306 of FIG. 1. An interface cable is extended through a connector on each tape drive and the last tape drive in the chain uses a terminator connector.

The tape drive can operate at 25 or up to 100 inches per second under software control, with a rewind speed of 200 inches per second. Thus, this gives a data transfer rate of 40 or 160 kilobytes per second on the peripheral interface. Approximately 40 megabytes of data will fit on a 2400 foot 10½ inch tape reel when using 5,000 bytes for each record.

The tape format used is the ANSI standard X 3.39-1973 (PE) which is 1,600 bytes per inch, phase encoded (PE) with the standard inter-record gaps. This allows the same tapes to be written-on and read, on both the magnetic streamer unit tape drives and also the 75/125 inch per second phase encoded tape drive units.

The printer-tape data link processor is organized to provide a unique and selectable data link processor address for the tape interface.

The other interface is the printer interface 40 of the data link processor. The printer interface connects to a Burroughs high speed standard interface (HSSI) which is seen as element 40 in FIG. 2. This interface can be modified by the Burroughs printer interface protocol used in Burroughs systems. Only one printer unit, line printer 44, may be connected to the printer-tape data link processor through the single peripheral adapter card 404 of FIG. 1.

The data rate allowable to the printer interface is 31.25 kilobytes per second. The data rate from the printer interface can be 153.8 kilobytes per second on the Burroughs B 924 printers. On the Burroughs B 9246 printers, the data rate from the printer interface is 100 kilobytes per second.

As was previously mentioned in regard to the "tape" interface, the data link processor (DLP) also provides a uniquely selectable DLP address for the "printer" interface.

With reference to FIGS. 1, 2, 3 and 4, the following description will indicate the various functions of the hardware shown in these drawings and with special reference to FIG. 4.

The printer-tape data link processor consists of a microprocessor system 101 which controls three other state machines. The microprocessor system 101 also includes a DMA controller 101$_d$ and microprocessor 101$_m$. The controllers discussed herein are sometimes referred to as "state machines".

The three other state machine controllers involved are:
 (a) The DLI interface 201 (FIG. 4);
 (b) The printer interface state machine 401 (FIG. 4);
 (c) The tape interface state machine 301 (FIG. 4).

A dual-port DLI buffer memory 108 (FIGS. 2, 4) of 8K bytes and the microprocessor local RAM memory (101$_{mp}$, FIG. 2) of 4K bytes are used to buffer the data to and from the peripheral units.

Microprocessor System

Figure 3:
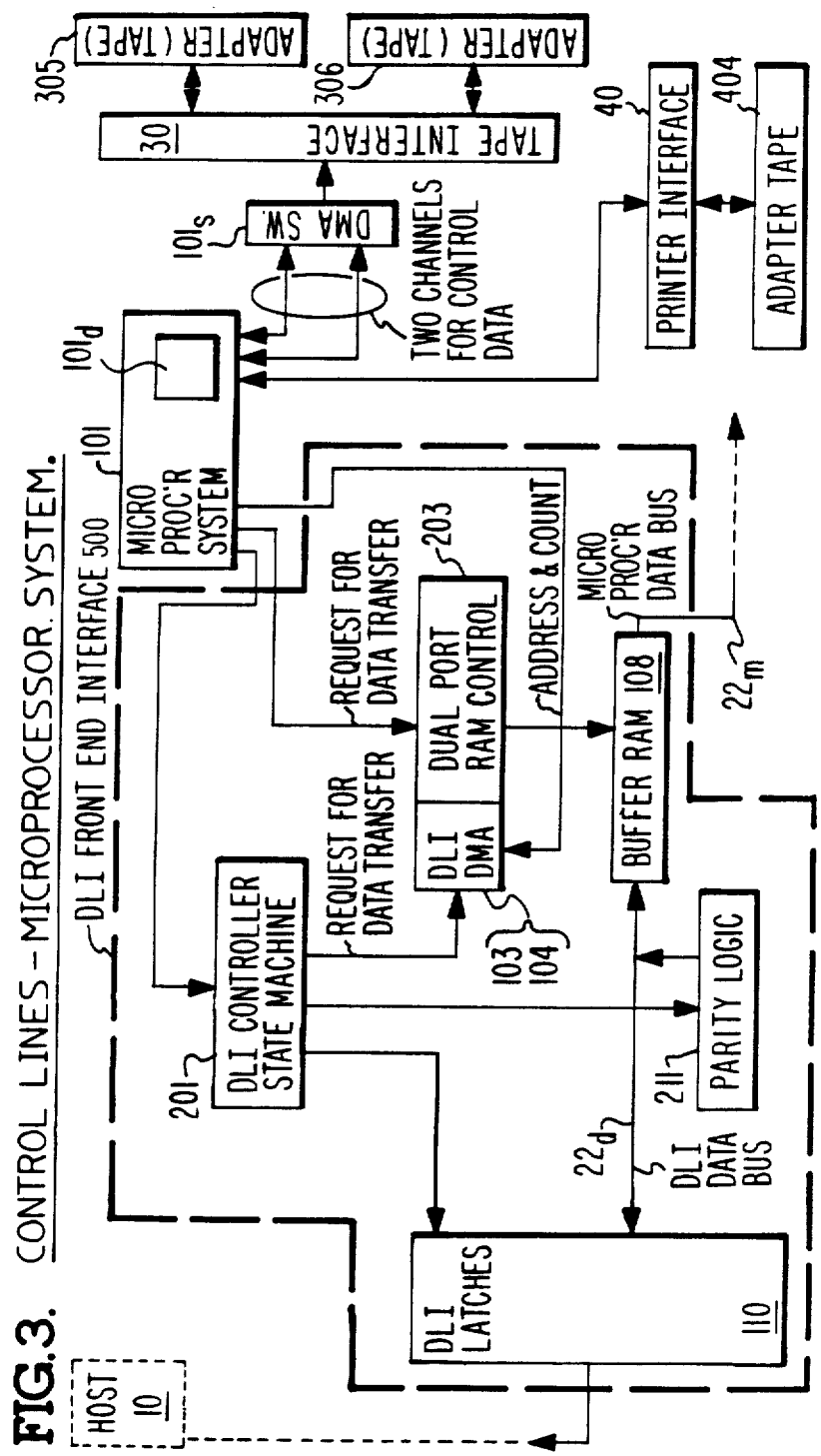
FIG. 3 shows a more detailed block diagram of the printer-tape data link processor indicating how the control lines of the microprocessor system links the data link interface front end to the peripheral terminal units.
Figures 4, 4A, 4B:
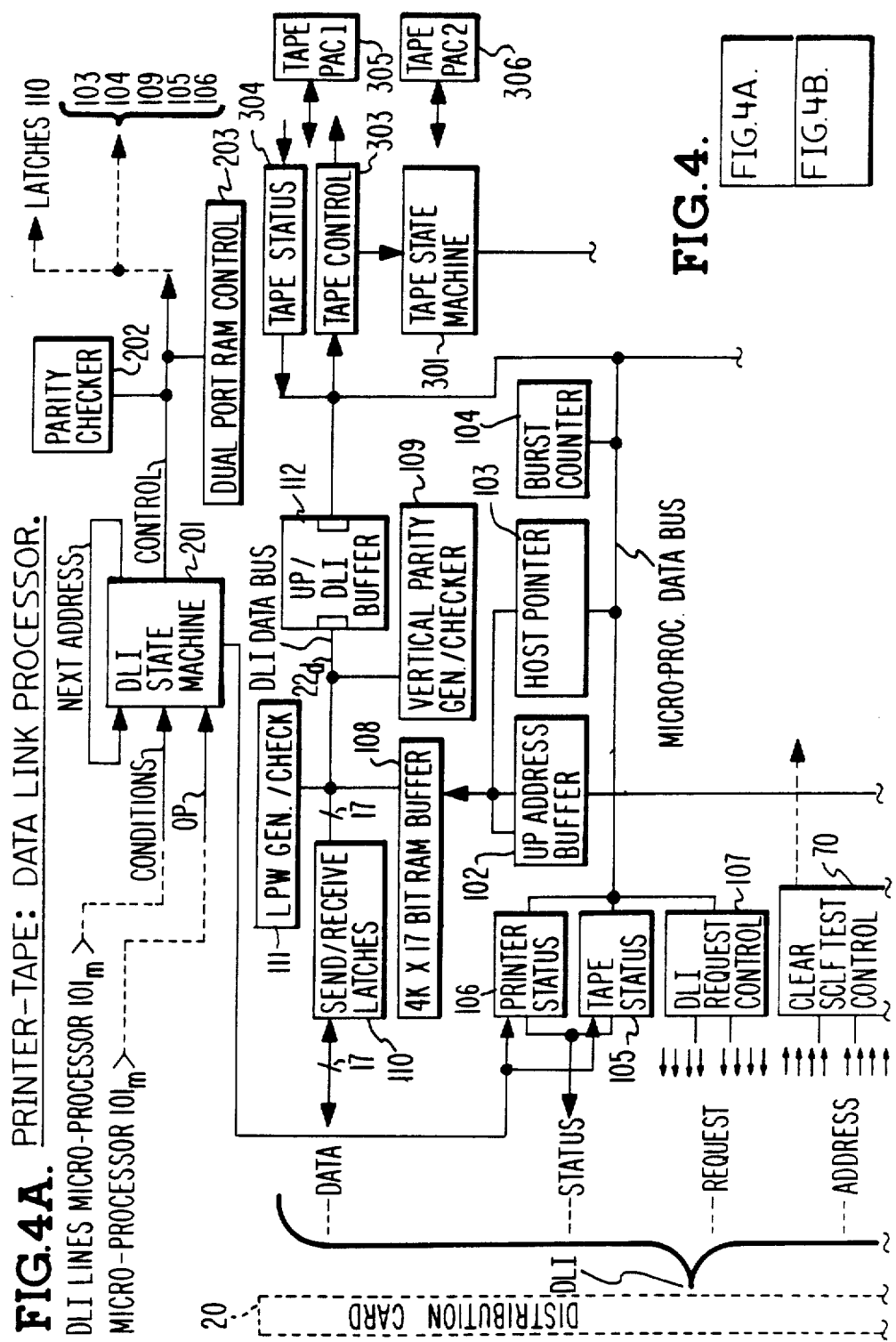
FIG. 4 which comprises
FIGS. 4A and 4B is an overall block diagram of the printer-tape data link processor.
Figure 4B:
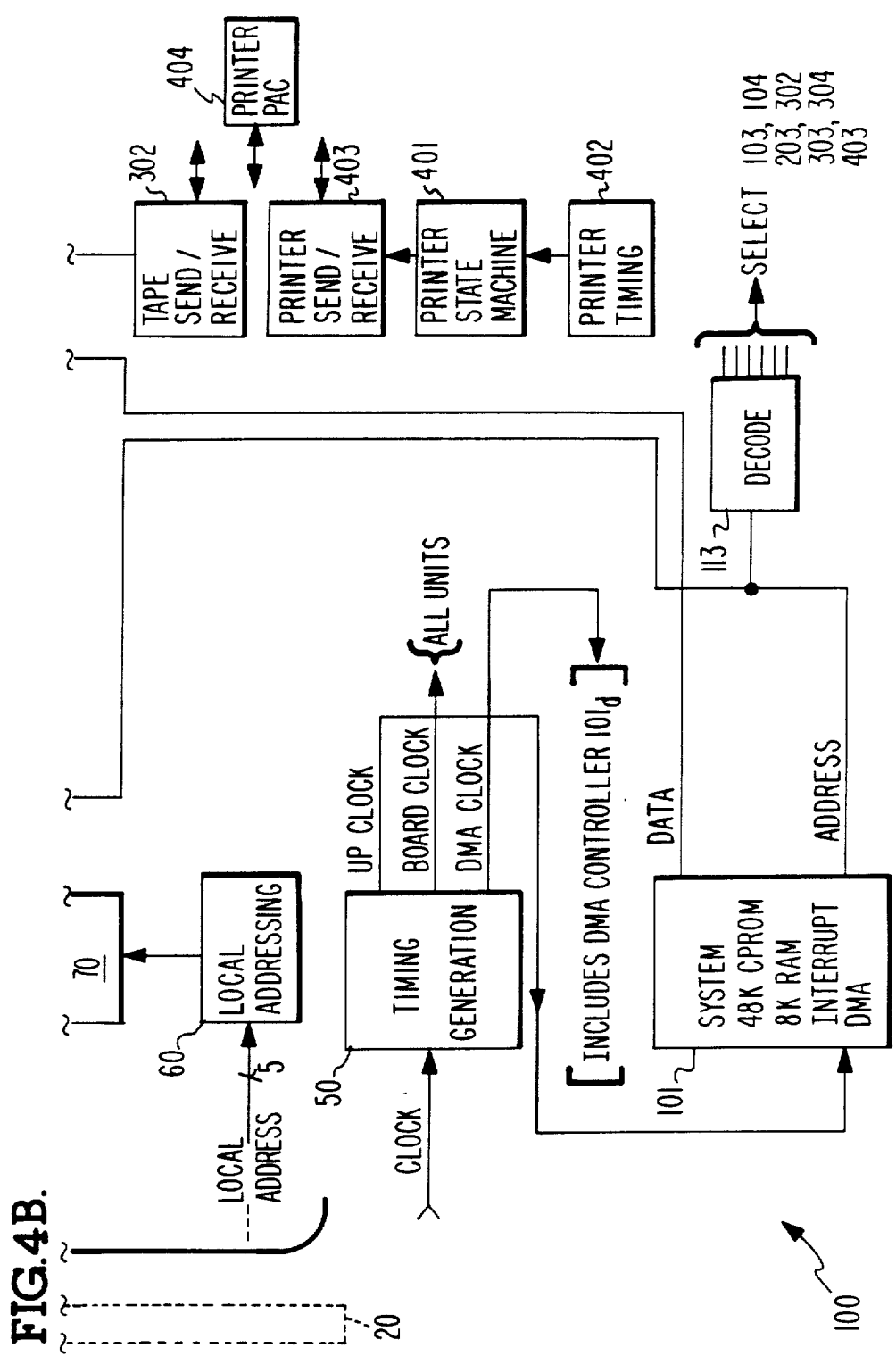

The microprocessor system 101 shown in FIGS. 3 and 4 includes an interrupt controller (in 101), a DMA controller 101$_d$ of FIG. 3, device selection logic (113, FIG. 4), a RAM (108 of FIGS. 3, 4) and an erasable PROM (EPROM) and a RAM which operates within block 101 of FIG. 4. All program storage is situated in the EPROM.

The microprocessor $101_m$ is an 8 megahertz 16-bit microprocessor of the type designated by Intel Corp. as the 8086. This processor unit is described in the handbook entitled "iAPX 86, 88 Users Manual", pages 1-2 through 2-72, copyright 1981, published by Intel Corp. of 3065 Bowers Avenue, Santa Clara, Calif. 95051.

The microprocessor system 101 provides for 64K bytes of addressing space in which there is provided a memory map which covers the following functions:

(a) 32 kilobytes of EPROM for interrupts and functional codes;
(b) 8 kilobytes for the dual-port RAM (108);
(c) 4 kilobytes for the memory-mapped I/O;
(d) 4 kilobytes for local RAM memory ($101_{my}$);
(e) 16 kilobytes of EPROM for reset and MTR (Maintenance Test Routines) code This local EPROM memory is split into two banks which are separately enabled by a signal called the "Bus High Enable" and by the A0 address line.

Address decoding is done in two stages. The first stage is done by a programmed logic array designated FPLA. Devices which require a longer setup time for selection will use outputs from the first stage directly. These include the memory (in 101), the interrupt controller (in 101) and the DMA controller ($101_d$).

The control latches (110, FIGS. 3 and 4) and the status buffers such as 105 and 106 of FIG. 4 (which are accessed by the microprocessor 101) will use the outputs from the second stage which consists of three decoders (113, FIG. 4) which are enabled by the first stage.

The interrupt controller (in 101) is used in the edge-triggered mode in order to detect the DLI message designated DLIMESS (DLI Message) and also the signal DMAEND (direct-memory-access-end-of-transmission), in addition to the 500 microsecond timing signal. The interrupt controller (in 101) provides vector addresses for the microprocessor $101_m$. The cable 22x shown in dotted lines of FIG. 3 represents a line of control signals which can be used to conrol other peripherals or for data communication.

The clear/self test interrupt (70, FIG. 4) is tied to the non-maskable interrupt line of the microprocessor 101 (Intel 8086). The board self test/reset and the manual self test/reset are tied to the reset line of the microprocessor 8086. The non-maskable interrupt and the reset interrupts will generate vectors internally within the 8086 and remove the interrupt controller (in 101) from the self test operations loop.

The DMA controller ($101_d$) is used to transfer data to and from the peripheral interfaces 30 and 40 (FIG. 3) and also the microprocessor local memory $101_{my}$ (FIG. 2). The DMA controller will also transfer data to and from the tape interface 3 and the dual port buffer memory 108 of FIGS. 3, 4.

One of the DMA channels will be dedicated to the printer interface. Then, two of the channels will be dedicated to the tape interface. The DMA controller $101_d$, in the microprocessor system 101, has two "control data" channels to a DMA switch $101_s$ in FIG. 3 which are used to alternately switch "control data" to the tape interface 30.

A multiplexor (in $101_s$, FIG. 3) is implemented in a programmed array logic unit which directs the request, the acknowledge, and the end-of-process signals to the appropriate channels. An "end of process" signal from the DMA controller ($101_d$), while servicing the tape interface, will cause a switch to the alternate tape "control" channel after the current acknowledge occurs.

A signal (OVRUN) produced from the DMASWITCH signal (of $101_s$) in the programmed array logic will be used to indicate that the switch over has occurred before the microprocessor has had time to initialize the channel. Thus, the signal "UP.DSRST" is used to "reset" the internal OVRUN state when initializing the DMA channel, when this occurs.

A microprocessor/DLI buffer unit 112 buffers data on the data bus $22_d$ (FIG. 4), which is transmitted to tape control unit 303. The output of the controller 201 is parity checked by parity checker circuit 202.

In FIG. 4, the local address latched 60 provide local printer addresses or local tape addresses to the Clear-Self Test Initialization Control 70.

Microprocessor System Clocks

The clock for the microprocessor 101 is derived from the 8 megahertz DLI backplane clock (50, of FIG. 4) using a delay line and gating. The "ready" input to the microprocessor 101 (8086) is synchronized to a clock by a D flip-flop. The clock for the DMA controller $101_d$ uses the 8 megahertz backplane clock divided by two in order to yield a 4 megahertz clock for the DMA controller $101_d$, FIG. 4.

DLI Interface

The DLI interface (DLI Front End, FIG. 3) consists of the clear and the self test initiation logic 70, FIG. 4; the DLI send/receive registers (110); the burst counter 104, FIG. 4; the burst-end logic (103); the longitudinal parity word generator 111, FIG. 4; the vertical parity generator and routing (109); the request and emergency request logic (107) and the DLI/controller communication logic (in 201).

A 2K×24 bit DLI state machine (201, FIG. 4), with parity, accepts condition signals from the microprocessor 101 and controls the data elements. The DLI state machine 201 (FIGS. 3, 4) also accepts status signals from and also provides control of portions of these elements. The specific types of control are as follows:

Functions of DLI State Machine Controller (201, FIG. 3)

(a) The clear and self test initialization logic (70 of FIG. 4) can detect when various types of clears and self tests are required. The signal LOCPAL detects the local address for either the printer or the tape data link processor and validates it with the signal ADRVLD (address valid) and the signal LOCAD (local address).

The comparison of the local address switch to the "LOCAD" signals is synchronized by system 101 for the PS (printer select) and the TS (tape select) signals;

(b) Generation of the clear and the self test signals, the resets, and the interrupts is performed by the signal "ADSTCL" (address, self test, clear PAL) or the programmed array logic. It also generates the signal "CONNECT" using the DLPADP (printer DLP address) and the signal DLPADT which is the tape DLP address signal;

(c) The DLI send/receive registers are implemented by bidirectional register latches (110 of FIG. 4). The output enable signal onto the DLI is generated by the "CONNECT" signal and by the IOSEND signal.

The latch enable from the DLI is controlled by the AF (asynchronous flag) signal. The clocking and enabling from the DLI front end is controlled by the DLI state machine 201, FIG. 4.

(d) The burst counter 104, FIG. 4, is implemented on a 20×8 PAL which is programmed as an 8 bit counter. It can be read and loaded by the master microprocessor $101_m$, with the count enable generated by the DLI state machine 201;

(e) The burst end logic in 101 uses the signal TERM (terminate), the signal CO (carry out of the burst counter), and the signal STIOL (strobe I/O level) in order to provide a condition input to the DLI state machine 201, FIG. 4, to halt the burst mode;

(f) The longitudinal parity generator 111 of FIG. 4 is implemented in two program-array-logic units which are programmed to perform the longitudinal parity word accumulation. A data pipelining latch composed of two latches 111 is used to meet the timing requirements on the internal DLI data bus ($22_d$ FIG. 4). The microprocessor $101_m$ controls the clearing and examines the longitudinal parity word "zero" status (LPWZERO) which indicates whether or not the transmitted word is without error. The DLI state machine 201 controls the accumulation and reading of the LPW generator 111. The pipelining latch-enable (connecting 201 to unit 111) is also controlled by the DLI state machine 201;

(g) Vertical parity generation and routing is performed by two 9-bit parity generators (109, FIG. 4) in conjunction with quad 2×1 tri-state multiplexors. A bidirectional register/latch 111, FIG. 4, is used to send and receive the parity bit on the data link interface. Vertical parity is generated and written into the parity RAM (part of 108) when writing into the dual port RAM (108 of FIGS. 3, 4) from the microprocessor system 101.

Vertical parity is checked when writing into the dual port RAM (108) from the DLI interface (FIG. 3) and the actual DLI parity is written into the parity RAM (of 108). Vertical parity is read from the parity RAM when reading onto the DLI data link interface. The timing of the memory-write cycle is met by using a tri-state buffer instead of using the tri-state capability of a bidirectional register latch. A flip-flop is used to store the parity checking result and is used to produce the signal VPERR (vertical parity error) status signal to the microprocessor $101_m$;

(h) Request and Emergency Request logic is implemented in a programmed array logic unit designated REQPAL (in 107). The microprocessor $101_m$ controls the setting of the printer request, the tape request and the emergency tape request signals. The signal REQPAL monitors the emergency request input to remove the printer request. It will also reset the tape request if the tape emergency request is not set. The DLI state machine controller 201 controls the clearing of the REQPAL requests when they are granted to meet the DLI timing requirements;

(i) The DLI/microprocessor communication logic, within 201, is contained in a programmed array logic unit called the DLI/UP PAL. Two settable and clearable flags are provided. the flags are:

(i) UPMESS—microprocessor message to the DLI;

(ii) DLIMESS—DLI state machine message to the microprocessor 101.

The DLI state machine parity error flip-flop is also implemented in the DLI/UP PAL. The microprocessor $101_m$ issues DLI operations (DOPS) to the DLI state machine 201 and sets a flag (UPMESS), which is fed into the state machine condition logic. The DLI state machine then carries out the operation.

The DLI state machine controller 201, then, can carry out the following operations:

Send strobe
Read data (one word)
Write data (one word)
Read burst
Write burst
Wait for connect
Wait for disconnect
Wait for AF signal (AF signal means handshake signal with host—so the controller 201 can wait for AF in order to tell the microprocessor $101_m$ when the host is ready)
Send LPW
Read host pointer
Move LPW to the RAM
Load the Send Register
Move Receive Register to the RAM
Load LPW from the RAM
No operation Upon completing the given operation, the DLI state machine controller 201 will set the signal DLIMESS, which will provide an "interrupt" to the microprocessor $101_m$. After the initial DLIMESS interrupt signal, the line DLIMESS will act as a "status input" to the microprocessor $101_m$ instead of the interrupt occurring constantly while connected to the host system 10.

A parity logic circuit 211 connects the controller 201 to the DLI latches of FIG. 3.

The DLI state machine controller 201 is implemented using three 2K×8 registers in the PROM for the control store and pipelined register. The condition logic in 201 is implemented in a program logic array, FPLA, and the condition latch is provided in two latch units.

The inputs to the condition logic of DLI state machine 201 (FIG. 4) are also available to the microprocessor $101_m$ as status inputs. A 3-bit microcode field is provided for condition selection. Another 3-bit field is provided for the unique next address selection of the DLI state machine 201 within any operation.

Four bits of the control store address in 201 are provided by the DOP (DLI operations). This gives the addressing environment for an operation. Three bits of the address are provided by the unique next address field. Four bits of the address are provided by the condition code inputs.

Parity checking of the control store (in 201) is done during the DLP operation by three 9-bit parity generators. The parity error indication is held in the programmable array logic designated DLI/UP PAL (201, FIG. 4).

Printer Interface

The printer interface consists of data send and data receive latches (403 of FIG. 4), parity generation and checking circuitry (not shown), a printer state machine controller 401 for interface control, and peripheral buffers (in 404) and loop back buffers (in 404).

The printer send/receive latches 403 are implemented by latching and enabling signals which are controlled by the printer interface state machine controller 401 (FIG. 4). Requests for data are made by the microprocessor system 101 (microprocessor $101_m$ or the DMA controller $101_d$ therein), together with the PUDAPSEL (printer-microprocessor data selection line).

The printer parity generation and checking is done by a 9-bit parity generator. Selection of the source of the inputs and the destination of the outputs is done by the printer state machine controller 401. The printer parity error is held in the printer program array logic in 401 (PRTPAL) and is used as a status indication to the microprocessor $101_m$.

Figure 5:
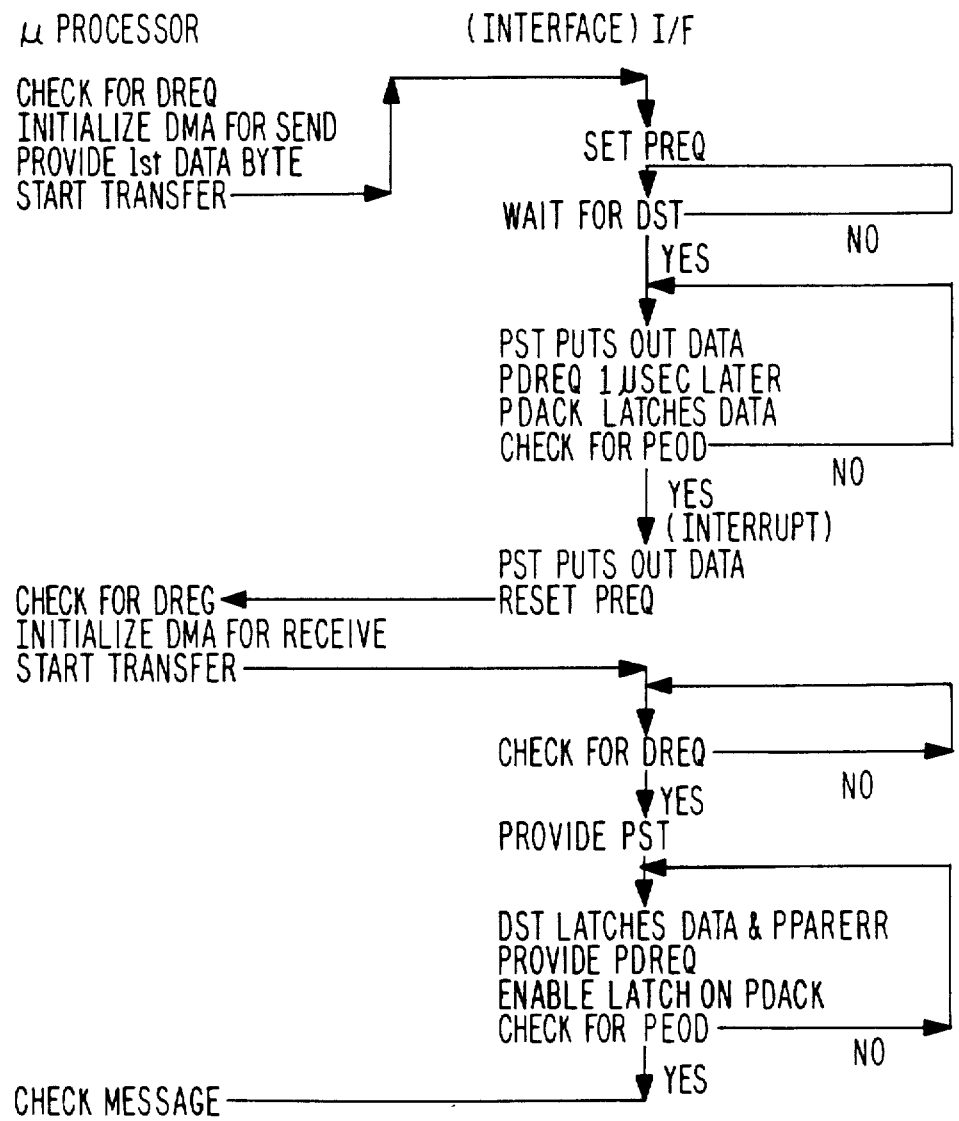
FIG. 5 is a functional flow diagram which shows the basic operation of the printer interface state machine.

The printer interface state machine controller 401 is implemented by the array logic of the PRTPAL. It performs functional transitions which are shown as a flow chart in FIG. 5.

Tape Interface

The tape interface (30 of FIG. 2) consists of send/receive latches, read and write parity generation, command registers, status buffers, and a tape state machine controller 301 (FIG. 4) to control the interface, peripheral buffers, and loop back buffers.

The send/receive latches 302, FIG. 4B, are implemented by four bidirectional latch/registers which provide one 16-bit word of data latch. The tape state machine controller 301, FIG. 4A, controls the loading and the enabling of the two 8-bit halves of the data latch to multiplex or demultiplex the data.

The read and write parity generation for tape transfers is performed by two 9-bit parity generators. Parity is generated on the "write" data path and checked on the "read" data path. When writing data to the tape, the read-after-write head returns the data which was written and the drive validates it with a strobe signal IRSTR (inverted read strobe).

The parity error indication is caught and held in the tape programmed array logic 304 (TAPPAL). The drive also produces a hard error signal (IHER) and also a corrected error signal (ICER) to indicate that the drive has detected parity errors from the tape. These signals are also caught and held by the tape programmed array logic, TAPPAL.

Command registers are implemented with two registers in the tape interface 30. Command signals, address signals and strobe signals are written in parallel onto these registers.

Status buffers return information on the currently addressed tape drive unit to the microprocessor $101_m$. The following signals: IHER (hard error); ICER (corrected error); the IFMA (file mark detected); the IEOT (end of tape); and the TPARERR (tape parity error) are pulses from the tape drive which are caught and held for access by the microprocessor $101_m$ by means of the TAPPAL. The TAPPAL 304 provides an error strobe signal as a tape data trap. It detects an error and holds the error signal until the end of the data transfer cycle at which time it informs $101_m$. The other status signals are provided directly from the addressed tape drive.

The tape interface state machine controller 301 is implemented in the programmed array logic 304 (TAPPAL) which is programmed to catch pulses and to sequence through several states. It controls the multiplexing and the demultiplexing of the two 8-bit halves of the data latches and the request/acknowledge handshake signal with the DMA controller, $101_d$, FIG. 3.

The tape interface state machine controller 301 will be seen to perform the functions which are flow charted in FIG. 6.

The tape peripheral buffers are on the two peripheral adapter cards 305 and 306 shown in FIG. 3 and in the interfaces 30 and 40 of FIG. 2. There are loop back buffers on the peripheral adapter cards to allow testing of the data and the control paths to the peripheral adapter cards, PAC 305, 306.

The signal M.TAPDAT is used to control the loop back paths in 305 and 306. The signal M.TAPDAT refers to "maintenance tape data: where the maintenance program is used to test the control paths and data paths between the logic cards of the SLP 100 and the peripheral adapter cards (PAC) 305, 306, and 404. When the maintenance program is enabled, the buffers to and from the peripherals are disabled and the path (in 302) between the read and the write paths is enabled. This allows the testing of the control and data paths between the main logic cards of the printer-tape DLP and the PAC's 305, 306, 404.

Dual Port Memory

The DLI buffer memory 108 (of FIGS. 2, 4) is a two port memory allowing access from the DLI state machine 201, and the master microprocessor system 101 which includes the microprocessor $101_m$ and the DMA controller, $101_d$.

The address path for the DLI state machine 201 is from a counter implemented in two program array logic units. This counter is initialized by the microprocessor $101_m$. The address path for the microprocessor system is through two buffers (address buffer 102, FIG. 4).

The "DLI data path" and the "microprocessor system data path" are separated by data latches. These data paths are shown in FIG. 2 as $22_d$ and $22_m$.

The control of the dual port memory (108 of FIGS. 2, 3, 4) is done by the dual port program array logic (shown as element 203 in FIGS. 3 and 4). It is programmed to do a "look ahead" of the request requirements of the DLI state machine controller 201 and the microprocessor system 101. It provides the data and address path "enabling", the RAM chip select, the RAM write enable and the microprocessor system "ready" signal. It also uses the signal AF (asynchronous flag) and the BURST signals to do a clock by clock (FIG. 7) interleaving of the DLI 201 and the microprocessor $101_m$ memory requests during the burst mode.

Self-Test Operations

The printer-tape data link processor (PT-DLP) has been designed to support the "self-test" function with three methods of initiation and two methods of reporting functionality of the data link processor.

The data link processor will begin its self-test function upon receipt of any of three clear signals:
 (a) foreplane clear which is generated by a pushbutton switch that is local to the main logic card;
 (b) a power-up clear;
 (c) two types of self-test initiation signals from the test bus on the DLI backplane. These two types consist of either being addressed and cleared while in the local mode, or by being generally addressed by the PT-DLP local general address and the complete self-test initiation signal being "true". The SWITCH lines are used to select between testing either (i) the printer portion; (ii) the tape portion; or (iii) a complete test of the printer-tape data link processor. The foreplane clear and the power-up clear both initiate a complete self-test of the printer-tape data link processor.

After initiation of the self-test of the data link processor portion being tested, this will disable its peripheral and DLI interfaces until such time as the data link processor passes its own self-test. A status of "zero" together with the signal LCPCON/O will be presented to the backplane whenever the addressed data link processor is executing or has failed to execute its self-test, or, in the case of a detectable on-line failure, such as a PROM parity error or a microcode sequencing error.

On the foreplane, four red light-emitting diodes (LED's) will also indicate the status of the test. When any of these LED's are "on", the data link processor is either in the process of self-testing, or has failed the self-test, or has detected an on-line failure.

The "top" LED displays the status of the self-test in relationship to the main logic card; the next one shows the status of the self-test with respect to the printer interface and its peripheral adapter card (PAC 404); the next LED light shows the status of the self-test with respect to the tape interface and the tape peripheral adapter card board #1 (305); and the fourth light shows the status of the self-test with respect to the tape interface and peripheral adapter card board #2 (306).

If a LED light is left on after the specified time for execution of the self-test, it indicates which card failed first. If the top LED light is "on" past the specified time for the test, it indicates that the peripheral adapter card (PAC) was not tested but that the main logic card has failed its self-test.

The scope of the self-test is a test of the main logic board hardware which affects the addressed device and the confirmation of the data paths to and from the peripheral adapter cards.

Drivers and receivers of the peripheral units (34, 44, FIG. 1) and the DLI interface (FIG. 3) are untestable by the self-test function and they require a stand-alone or a peripheral test driver test.

The length of the self-test for the printer section of the data link processor can be set not to exceed a predetermined number of seconds. Likewise, the length of the self-test for the tape section of the data link processor can be set so that it shall not exceed another set value of a predetermined number of seconds. Likewise, the length of the self-test for the complete data link processor (including both printer section and tape section) shall not exceed another predetermined set number of seconds.

Referring to FIG. 3, there is seen the dual port RAM control 203 which is controlled by the microprocessor system 101; and the data link interface controller 201 in conjunction with the DLI-DMA (direct memory access unit 103, 104, also in FIG. 4).

The dual port RAM control 203 is used to control the RAM buffer 108 of FIG. 3.

It may be noted that while FIG. 3 mainly shows "control" lines, FIG. 3 also shows data buses where data can be transferred from the host 10 through the DLI latches 110 over through the DLI data bus $22_d$ and into the RAM buffer 108. Here the data may be processed via bus $22_m$ through the microprocessor system 101 and transferred either to the tape interface 30 or the printer interface 40, for later transfer to the peripheral.

Likewise, the data from either the printer peripheral unit 44 or the tape peripheral unit 34 may be transferred through the interfaces 40 and/or 30 on to the microprocessor system 101 and hence through the buffer RAM 108 and over through the DLI data bus $22_d$ to the host 10.

The buffer RAM 108 may be considered a "dual port" RAM for the purpose of storing temporarily the data which is either travelling from a peripheral unit to the host system ("Read") or for data which is travelling from the host system to a selected peripheral unit ("Write"). Thus, data flow through the RAM buffer 108 is concurrent and simultaneous in either direction. This is accomplished through an "interleaving" process cycle.

Referring to FIG. 7, there is shown a series of timing diagrams which show the clocking signals used for data transfer in the "Read" direction and for data transfers in the "Write" direction. The "Read" direction means that data is being transferred from a peripheral terminal unit to the buffer memory 108 for later transfer over to the main host system. The "Write" direction means that data is being transferred from the main host system to the buffer memory 108 for later transfer to a selected peripheral terminal unit.

In FIG. 7 it will be seen that by the end of the clock 1 time, the dual-port RAM 108 will have the necessary access information to permit an interleaving of data to occur at the clock 2 time or the clock 3 time.

In the Read cycle of FIG. 7, the first line shows the clocking signal. The second line designated ALE is the signal which indicates the microprocessor address latch enable.

The third line designated M/IO is the signal which indicates whether microprocessor $101_m$ is selecting memory space or I/O space.

The fourth line designated AD015 indicates the relationship between the valid address signal and the actual valid data signal which is separated by 1 clock. It shows the use of the bus for address information and the time period available for data transfer.

The fifth line shows the signal $\overline{RD}$. This signal indicates when the read data can be transferred into or out of the RAM 108.

The sixth line which is labeled with DT/$\overline{R}$ indicates the Data Transmit/Receive condition which indicates the direction of data flow.

In the second portion of FIG. 7 there is seen the "Write" cycle. As before, the clock signal, the ALE signal, the M/IO signal, the address signal and the DT/$\overline{R}$ signal are the same except for line 5 where we have a $\overline{WR}$ or Write signal instead of a Read signal.

In the Write cycle it will be seen that immediately after the address is provided, the data for the Write direction can be transferred out to the peripheral adapter units.

It will also be noticed that, in the Read cycle, there is a 20 nanosecond set-up time for the read-data and a 10 nanosecond hold time for the read-data.

In the Write cycle there is a 60 nanosecond delay after the address data in order for the write data to be transferred. The write data has a 10 nanosecond delay which permits clearance of data from the buffer register in the RAM 108.

The third (lowest) portion of FIG. 7 shows the DLI access clock with a sequence of clock cycles numbered 1, 2, 3, 4, 5, etc. Here, during the first clock cycle, the DLI state machine 201 has access to the buffer memory 108 (for either transferring data out or transferring data in).

The next clock cycle (cycle 2) then provides the second time period for the microprocessor $101_m$ to gain access to buffer 108 (for either transferring data in or transferring data out). Then access periods alternate between availability for the DLI controller 201 and the master microprocessor $101_m$.

Thus, it is possible to have "Read" data moving from a peripheral unit to the main host system concurrently and at the same time that "Write" data is moving from the main host system to a peripheral unit through the same RAM buffer 108 even though various registers of this RAM buffer are used.

Figure 8:
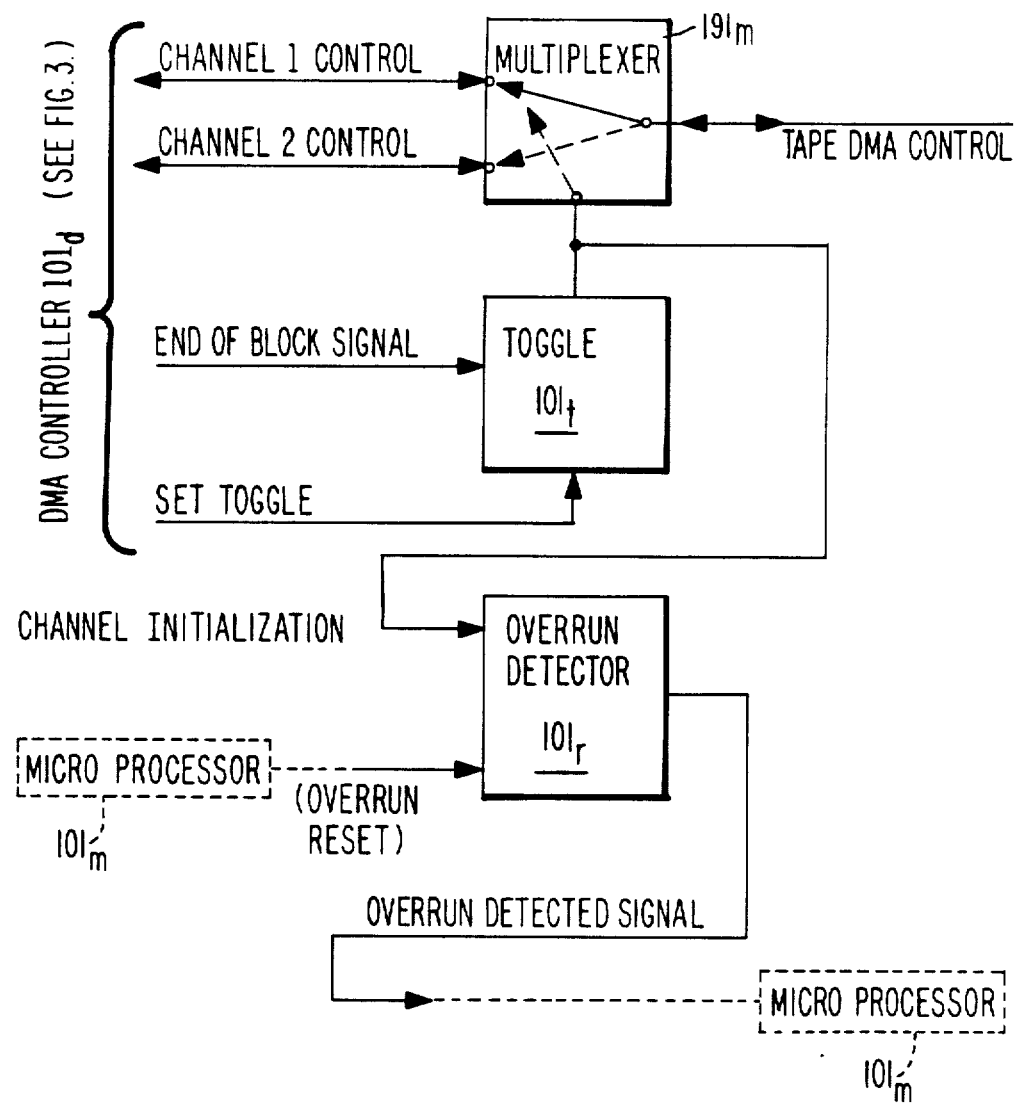
FIG. 8 is a schematic diagram illustrating the automatic channel switching for control data utilization.

With reference to FIG. 8, there is shown schematically how multiplexor $191_m$ is used to switch between channel 1 and channel 2 for control data operations. A toggle $101_t$ controls the channel switching in the multiplexor $101_m$.

At the end of the transfer of a data block, the End-of-Block signal from DMA controller $101_d$ causes toggle $101_t$ to change state. This switches the tape DMA control signals (from 101 and 30 of FIG. 3) from channel 1 to channel 2, and vice versa using multiplexor $191_m$.

The overrun detection circuitry $101_r$ will detect an "error" condition wherein the "other channel being switched to" has not yet been initialized by microprocessor $101_m$. In this event, the non-initialized condition would cause invalid data to be transferred to the peripheral tape unit.

There has thus been described a peripheral controller where a master microprocessor commands and coordinates the operation of a DLI (data link interface) slave controller, a tape interface slave controller, and a printer interface slave controller which permits a buffer memory in the DLI interface front end to intake and to output data-being-transferred concurrently in either direction (host to peripheral or peripheral to host) in an interleaving cycle process. Further the master microprocessor controls a DMA switch unit which permits alternate control data channels to manage data transfers to/from the tape peripheral units by causing a control channel switchover each time after a block of data is transferred to/from a tape unit.

While other possible embodiments may also be used to effectuate the features described herein, the invention should be understood to encompass the system described in the following claims:

What is claimed is:

1. A peripheral controller, designated as a data link processor, for controlling data transfer operations between a host computer, a printer peripheral unit, and a plurality of tape peripheral units, comprising:
   (a) master microprocessor means for controlling a plurality of slave-controller means, said means including:
      (a1) a master microprocessor for controlling operations of a DMA slave controller means, of a tape state machine slave controller means, of a printer state machine slave controller means, and of a data link interface (DLI) slave-controller means connected to a buffer memory means;
      (a2) said DMA slave controller means for controlling data transfer to/from said tape peripheral units via said tape state machine slave controller means, said DMA slave controller means including:
         (a2a) first and second output control data channels for transmitting control data to a tape interface means;
   (b) a data link interface (DLI) means for connecting said host computer to said peripheral controller, and said buffer memory means, and including:
      (b1) said data link interface (DLI) slave-controller means for controlling data transfer operations between said host computer and said buffer memory means;
      (b2) said buffer memory means being alternately accessed by said master microprocessor means and said data link interface (DLI) slave-controller means, said buffer memory means being connected to said host computer via a DLI data bus and connected to a tape interface means and a printer interface means via a master microprocessor data bus;
      (b3) said DLI data bus connecting said host computer via said DLI interface means to said buffer memory means:
   (c) said tape interface means including;
      (c1) said tape state machine slave-controller means for controlling data transfers between said buffer memory means and said plurality of tape peripheral units, said tape state machine slave-controller means including:
         (c1a) means for automatically switching the control of data transfer operations between said first and second output control data channels;
         (c1b) peripheral bus connection means to said plurality of tape peripherial units;
         (c1c) means to generate, to said means for automatically switching, an end-of-transmission signal when a particular data transfer operation is terminated;
   (d) said printer interface means connected to said buffer memory means via said master microprocessor means, said printer interface means including:
      (d1) bus connection means to a peripheral printer unit;
      (d2) a printer send-receive latch for temporary storage of data being transferred between said printer peripheral unit and said buffer memory means;
      (d3) printer state machine slave controller means under command of said master microprocessor means and including:
         (d31) means for controlling data transfers between said printer send-receive latch and said printer interface means;
         (d32) means to control the allocation of tape data transfer requests from said DMA slave controller means and printer data transfer requests from said printer peripheral unit.

2. The peripheral controller of claim 1, wherein said means for automatically switching includes:
   (a) DMA switch means for automatically switching the utilization of one said output control data channel to said other output control data channel, upon receipt of said end-of-transmission signal from said DMA slave controller, said DMA switch means connected to either of said first and second output control data channels via control signals from said DMA slave controller.

3. The peripheral controller of claim 2, wherein said DMA switch means includes:

(a) means to sense said end-of-transmission signal from said DMA slave controller upon termination of control data transfers in either of said first and second output control data channels;

(b) means to switch control data transfer operations to the other output control data channel from that just utilized;

(i) and wherein said master microprocessor means further includes:

(c) a DMA subcontroller for generating control data to said tape peripheral units for transmission to said DMA switch means via said first or second output control data channels.

4. A peripheral controller, designated as a data link processor for controlling data transfer operations between a host computer, a printer peripheral unit, and a plurality of tape peripheral units, comprising:

(a) master microprocessor means for controlling a plurality of slave-controller means, said means including:

(a1) a master microprocessor for controlling operations of a DMA slave controller means, of a tape state machine slave controller means, and of a data link interface (DLI) slave-controller means connected to a buffer memory means;

(a2) said DMA slave controller means for controlling data transfers to/from said tape peripheral units via said tape state machine slave controller means, said DMA slave controller means including:

(a2a) first and second output control data channels for transmitting control data to a tape interface means;

(a2b) a DMA subcontroller for generating control data to said tape peripheral units for transmission to a DMA switch means via said first or second output control data channels;

(b) a data link interface (DLI) means for connecting said host computer to said peripheral controller, and to said buffer memory means, and including:

(b1) said data link interface (DLI) slave-controller means for controlling data transfer operations between said host computer and said buffer memory means;

(b2) said buffer memory means being alternately accessed by said master microprocessor means and said data link interface (DLI) slave-controller means, said buffer memory means being connected to said host computer via a DLI data bus and connected to a tape interface means via a master microprocessor data bus;

(b3) said DLI data bus connecting said host computer via said DLI interface means to said buffer memory means;

(c) said tape interface means including:

(c1) said tape state machine slave-controller means for controlling data transfers between said buffer memory means and said plurality of tape peripheral units, said tape state machine slave-controller means including:

(c1a) means for automatically switching control of data transfer operations alternately between said first and second output control data channels, said automatically switching means including:

(i) said switch means for automatically switching the utilization of one said output control data channel to said other output control data channel, upon receipt of a end-of-transmission signal from said DMA slave controller means, said DMA switch means connected to either of said first and second output control data channels via control signals from said DMA slave controller means, and wherein said DMA switch means includes:

(i-a) means to sense said end—of—transmission signal from said DMA slave controller upon termination of control data transfers in either of said first and second output control data channels;

(i-b) means to switch the control data transfer operations to the other output control data channel from that channel just utilized;

(c1b) peripheral bus connection means to said plurality of tape peripherial units;

(c1c) means to generate, to said means for automatically switching, said end-of-transmission signal when a block of data has been transferred between said buffer memory means and said tape peripheral unit;

(d) a printer interface means connected to said buffer memory means via said master microprocessor means, said printer interface means including:

(d1) bus connection means to a peripheral printer unit;

(d2) a printer send-receive latch for temporary storage of data being transferred between said printer peripheral units and said buffer memory means;

(d3) printer state machine slave controller means under command of said master microprocessor means and including:

(e1) means for controlling data transfers between said printer send-receive latch and said printer interface means;

(e2) means to control the allocation of (i) tape data transfer requests from said DMA subcontroller, and (ii) printer data transfer requests from said printer peripheral unit.

5. The peripheral controller of claim 4 which includes:

(a) access control means for controlling access to said buffer means for placing in or removing data thereform, said access control means being controlled in alternate cycles by said DLI slave-controller means and said master microprocessor means.

6. The peripheral controller of claim 4 wherein said access control means includes:

(a) dual port control means for receiving control and address data from said master microprocessor means, said port control means including:

(a1) means to regulate the buffer memory means access time period permitted to said DLI slave-controller means and to said master microprocessor means;

(b) DLI-direct memory access means for receiving control and address data from said DLI slave-controller means.

7. The controller of claim 4 wherein said means for automatically switching control of data transfer operations includes:

(a) overrun detection means for signaling said master microprocessor when said first or second control data channels have not yet been initialized.

* * * * *